Patented Mar. 17, 1953

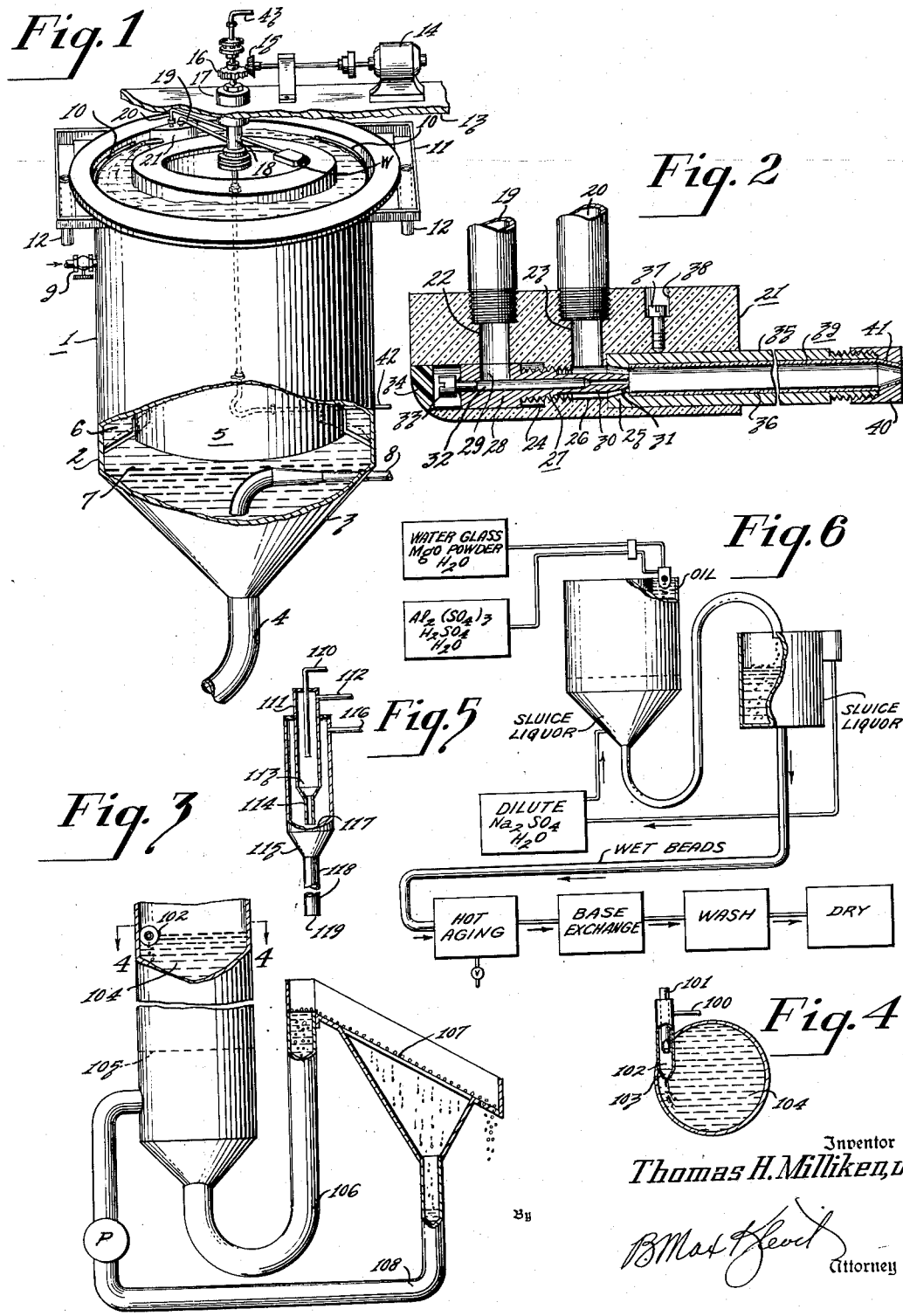

2,631,983

UNITED STATES PATENT OFFICE 2,631,983

PREPARATION OF SILICEOUS CATALYST BEADS CONTAINING FREE MAGNESIA

Thomas H. Milliken, Jr., Chester, Pa., assignor to Houdry Process Corporation, Philadelphia, Pa., a corporation of Delaware Application December 29, 1948, Serial No. 67,987

5 Claims. (Cl. 252—448)

The present invention relates to catalytic hydrocarbon conversion processes employing siliceous plural oxide catalysts and is particularly concerned with the preparation of such catalysts and their use in cracking of hydrocarbons in the production of desired liquid fuels of lower boiling point, such as gasoline.

The catalysts most widely used for hydrocarbon conversion processes of the type described include natural materials such as acid-activated sub-bentonite clays, and synthetic gels such as silica-alumina. The substitution of other metal oxides in whole or in part for the alumina in synthetic siliceous gel catalysts is also known. Among these, interesting results have been obtained with catalysts such as silica-magnesia and silica-alumina-magnesia, because of their selectivity in producing from a heavier charge stock good yields of liquid hydrocarbons in the gasoline boiling range.

In the preparation of siliceous plural oxide gel catalysts one of the methods in practice is to dry a hydrogel or gelatinous precipitate and to grind the obtained gel to desired size for use in finely powdered condition as catalyst in so called "fluidized" systems of hydrocarbon conversion. In other systems of hydrocarbon conversion, larger masses or pieces of catalyst are generally preferred, which may be prepared by forming ground dried gel into aggregates, for instance such as cylindrical pellets.

In contrast to the above described methods of catalyst preparation involving subdivision of a previously formed gel, catalyst has also been prepared by methods in which the original conformation of the gel as set is maintained during subsequent drying and finishing operations. The latter type method is employed particularly in the preparation of substantially spherical or spheroidal bodies of gel, known as "beads," which are produced, in controlled desired average size range, by setting droplets of hydrosol in a fluid medium, generally in a liquid immiscible with the hydrosol. The bead catalyst so produced, although having certain advantages particularly from the standpoint of facility of preparation, is less porous than finely ground gel catalyst or aggregated bodies formed of ground gel, which difference in porosity is particularly evidenced by the slower regeneration rates ordinarily obtained in use of the bead catalyst.

In my copending application, Serial No. 529,594, filed April 5, 1944 (now issued as Patent No. 2,487,065), of which the present application is a continuation-in-part, certain procedures are described for enhancing the regeneration characteristics of catalyst produced by methods in which the original conformation of the gel as set is maintained during subsequent drying and finishing operations, including bead catalyst. In accordance with the methods therein described, the catalyst acquires a more open structure and is more readily and more rapidly penetrated by fluids. This opening of the gel structure is obtained by incorporating in the initial hydrosol, from which the gel is formed, certain finely divided powdered materials which are distributed through the hydrogel during setting. When such powders are of proper size range and are present in certain volumetric quantities as specified in said prior application, additional advantages ensue; for instance, drying of the hydrogel pieces is facilitated and breakage of the pieces otherwise occurring during drying is materially reduced. As indicated in said prior application, the powders thus incorporated in the gel may be relatively inert materials or may comprise finely divided gels or metal oxides which contribute to the properties of the catalyst, as catalytically active materials, promoters, or the like.

The present application involves an extension of the principle and advantages described in the said parent application, resulting in new and additional advantages in the methods of catalyst preparation and in the use of such catalyst in hydrocarbon conversion operations, particularly in cracking of petroleum oils for the production of gasoline.

In accordance with the invention of the present application the powder, incorporated in the sol and retained in the hydrogel setting therefrom is magnesium oxide (which may be in the form of hydrous oxide, hydrate, or hydroxide), a material which is catalytically active in association with the inorganic oxide component or components of the hydrogel. The sol is one capable of setting to a siliceous hydrogel, which may be essentially hydrated silica, alone, or in association with a catalytic non-reducible metal oxide, such as alumina. The preferred catalysts prepared and used in accordance with the invention comprise silica-magnesia and silica-alumina-magnesia as beads of open structure and improved regeneration characteristics, prepared by incorporation of active powdered magnesia into a siliceous hydrosol, and maintaining the magnesia therein in particulated form as such or as an insolubilized derivative thereof, at least during the setting of the hydrogel beads and the drying of the same.

Various methods may be employed for the formation of the hydrogel beads containing incorporated powder. Several preferred techniques are illustrated in the accompanying drawings, wherein Figure 1 is an isometric view, largely schematic, of one form of structure that may be employed in bead formation; Figure 2 is a vertical cross-section on an enlarged scale through a portion of the device shown in Figure 1, comprising generally the mixing head and discharge nozzle; Figure 3 is a schematic representation of an alternative embodiment, useful particularly for the production of smaller beads; Figure 4 is a plan view, partly broken away and shown in section taken along line 4—4 of Figure 3; Figure 5 is a schematic representation of a further alternative modification of a mixing and emulsifying device; Figure 6 is a flow diagram illustrating the preferred sequence of steps in forming and processing of gel beads. The operation of these and other alternative embodiments will be fully understood from the description below.

The magnesium oxide is incorporated in the siliceous sol in the form of fine particles, which are suspended in the sol and remain substantially uniformly distributed therein during the setting of the sol to hydrogel. For this reason it is advantageous to employ rapidly setting sols, for instance sols which set in about 5 seconds or less, so that the magnesium oxide powder becomes fixed in the sol and has little opportunity to settle out and become localized in the gel during setting. As described in the parent application hereinbefore referred to, the incorporated powder should be of a size less than 50 microns and preferably less than 35 microns, to provide the desired opening of the gel structure such that the rate of regeneration of the catalyst is significantly increased. To fully obtain the additional advantages of facilitating drying and reducing breakage during drying, the powder should be present in controlled quantities, as will hereinafter appear.

In the production of spheroidal gel bodies containing incorporated powder, such as magnesia in the present instance, the powder may be suspended by being directly mixed with the sol, or preferably the powder is admixed with one of the reacting solutions from which the sol is to be formed. To this end, the methods and apparatus described in U. S. Patent Nos. 2,384,455 and 2,385,217 may be employed in suspending droplets of the sol containing the incorporated powder into a quiescent body of water-immiscible liquid. With rapid setting hydrosols, however, it is preferred to employ a type of apparatus and procedure such as that described in my copending application Serial No. 41,983 filed August 2, 1948 (issued March 11, 1952, as U. S. Patent No. 2,588,402), one form of which is illustrated in the accompanying drawings Figures 1 and 2.

If desired, as may be the case with very small spherical or spheroidal beads, particularly below the order of about 200 μ diameter (in dried or calcined state), the sol may be emulsified in the water immiscible medium by rapid agitation to form thereby droplets of required size range, such size being regulated by the rapidity of agitation. With such minute beads, of course, comparatively finer powders are employed for incorporation therein.

For purposes of clarity, it is here pointed out that in this specification and the sub-joined claims the term "hydrogel" is used to indicate the solid colloid produced by setting of a sol, which solid colloid is a jelly-type of material including all of the reactant solutions of the sol. The term hydrogel, as used herein, is distinguished from the gelatinous precipitate which, when formed, is suspended in the liquor of the sol.

The required fine subdivision of the powder to be incorporated may be obtained by precipitating magnesium oxide and grinding the precipitate to desired size, with or without previous drying. The particle size of the obtained precipitate may also be controlled by selecting the conditions of precipitation, thereby avoiding the necessity for extensive grinding. Thus, a soluble magnesium salt, such as magnesium chloride, may be precipitated by conversion to carbonate. The carbonate is formed as a fine pulverulent precipitate which is converted to the oxide by heating, retaining its pulverulent form.

Magnesia of suitable properties for use in accordance with the invention is readily available commercially. It is supplied in a very bulky form known as "Light Magnesia" and in a dense form called "Heavy Magnesia." Either form may be used for incorporation in the sol. Magnesia is also readily prepared in precipitated form by addition of alkali or ammonia to an aqueous solution of a magnesium salt such as magnesium sulfate at suitable pH.

Magnesia, under suitable conditions takes up water, reforming magnesium hydroxide. It is believed, that when magnesia is incorporated in the sol such hydration initially occurs with subsequent reaction of the resulting hydrate or hydroxide with the components of the sol or of the wet hydrogel during setting, so that at least a part of the magnesium becomes incorporated in chemical combination as a complex with the silica, or with silica and alumina. For this reason it is best to employ a magnesia which has not been calcined at such high temperatures as to render the same practically non-hydratable under the conditions. Accordingly, where the magnesia is to form an active component of the gel the use of "dead burned" magnesia, or magnesia which has been calcined at a temperature above 2,500° F., is not advised.

Rapid setting of the hydrosol to the gel state is favored by hight product concentration of the components forming the solid phase of the hydrogel, with the added advantage that compositions of high product concentration tend to produce firmer hydrogel beads, better capable of withstanding subsequent handling and treating in the finishing operations, and resulting in hardier dried beads with lesser quantities of broken fragments. Since, moreover, the hydrogel formed from reactants in high product concentrations will have comparatively lower water content, considerable savings in drying costs are gained, and milder drying conditions may be beneficially employed to effect drying in a reasonable time. Rapidity of setting is also dependent upon the pH of the hydrosol as well as on temperature, either of which factors can be readily controlled to provide additional adjustment of desired setting time. For practical operation in the preparation of silica hydrogel or silica-alumina hydrogel containing incorporated magnesium oxide, it is preferred to employ concentrations, compositions, and conditions such that the hydrosol is set to hydrogel in no more than about 5 seconds. Employing the preferred apparatus and the manipulative procedures hereinafter described, hydrosols setting as rapidly as $\frac{1}{10}$ second can be handled.

An optimum pH range obtains for hydrosols of particular composition at which most rapid setting will occur. With silica as well as silica-alumina hydrosols most rapid setting takes place at between about 5 to 9 pH, the setting time increasing with both higher or lower pH outside of this range. Within the indicated pH range, silica-alumina hydrosols setting in less than 0.5 second are readily obtained with product concentrations above about 80 grams $SiO_2$ and $Al_2O_3$ per liter of mixed reacting solutions (not considering MgO powder). Compositions going up to 125 grams per liter and somewhat higher (not considering the added powder) product concentration can be readily handled by methods herein described. Within the designated optimum pH range for rapid setting, silica hydrosol will set to hydrogel in about one-half second or less at a product concentration above about 100 grams per liter $SiO_2$, and compositions of even higher product concentration than in the case of $SiO_2$-$Al_2O_3$ can be handled without unusual difficulty.

Coming now to the preferred method for forming siliceous beads containing incorporated magnesia. An apparatus that may be employed in practice is shown in Figures 1 and 2 of the accompanying drawing.

The illustrated apparatus comprises an outside liquid container 1, provided with a vertical wall 2 forming its cylindrical section, and a downwardly converging wall 3 forming a funnelled lower section which communicates with a discharging sluice pipe 4.

Within the external tank 1 there is suitably supported an internal cylindrical tank 5 closed at the bottom, and forming an annular chamber 6 between the wall 2 and the outer wall of cylinder 5, in the upper portion of the tank 1. In operation, the funnelled lower portion of tank 1 is filled with liquid, such as water or other aqueous solution, up to approximately the level of the closed bottom of the inside cylindrical tank 5, or to some extent above or below that level, and a water immiscible liquid such as an oil is supplied thereabove, as indicated by the liquid interface at 7 between the two liquids. The exact level of the water in the tank is not important, provided there is sufficient oil in the annular chamber above the water level for the purposes hereinafter explained. A continuous supply of water or other aqueous solution into the lower part of the tank 1 is furnished by means of a supply line 8. By modifying the rate of liquid supply through line 8 with respect to the discharge rate through sluice pipe 4, the level of the interface 7 can be raised or lowered.

Water immiscible liquid, such as oil, is supplied in the annular chamber 6 by means of a valve-controlled supply line 9. The upper level of the water immiscible liquid in the tank is maintained by means of slots 10 or other openings formed in the outside wall 2 near the top of the tank, said slots or other openings permitting the water-immiscible liquid to overflow into a pan 11, suitably mounted on the periphery of wall 2 and extending over a desired circumferential portion of such periphery. One or more of such pans communicating with openings in the wall may be provided; two being here shown. Each of the pans 11 communicates with a collecting pipe 12, which pipe may be connected to a storage reservoir or to a suitable pumping system operatively connected to line 9 for recirculation of overflowed oil continuously or intermittently as desired.

A supporting structure generally indicated by 13 is mounted above the upper level of the tank 1, on which structure are mounted the operating and power-transmission mechanism, including a prime mover such as an electric motor designated at 14, and gearing 15 and 16 operating to rotate the drive assembly. A bearing housing 17 is affixed to the supporting structure 13 and thereby suspends the driven shaft and component parts above the center of tank 1.

The driven structure includes a rotating shaft 18, to which are attached liquid conducting lines 19 and 20, which lines are positively moved in a circular path by the rotation of shaft 18. These liquid conducting lines 19 and 20 communicate with and are attached to a streamlined boat-shaped member 21 comprising the mixing head, which member is thus moved in a circular path concentric with the annular space 6; the motion of the shaft 18 being transmitted through lines 19 and 20.

The shaft 18 is formed with a central upper vertical bore and a non-communicating central lower bore, through which bores reactant liquids are introduced. These bores respectively communicate with the conducting lines 19 and 20 for conveying liquids to the mixing chamber formed in the mixing head 21. The reactant liquids enter the mixing head (as particularly shown in Figure 2) and are admixed therein at a high velocity as a result of jet action. The streamlined body forming the head 21 is made of a corrosion-resistant material, such as Lucite or other plastic, and is provided with vertical bores 22 and 23 at the upper surface thereof, which bores pass only partly through the body, as shown. The bores 22 and 23 at the upper portions thereof are counterbored and screw threaded to receive respectively the downwardly directed elbows of liquid conducting lines 19 and 20. The head 21 is also provided with a central horizontal bore at the lower portion thereof extending from the front to short of the center as indicated at 24, and with a horizontal bore extending from the rear to short of the center as indicated at 25; the two passages thus formed being connected by a communicating bore of reduced diameter in alignment therewith as indicated at 26. The vertical bore 22 thereby communicates with the horizontal bore 24 and the vertical bore 23 communicates with the horizontal bore 26. The portion of the bore 26 extending from the inner terminus of bore 24 to the side wall of bore 23 is screw threaded to receive a correspondingly threaded jet member 27 provided with an enlarged portion forming a boss 28 adapted to fit closely within the bore 24. This enlarged portion of the jet member is provided at its upper surface with a recess 29 corresponding to and communicating with bore 22; the recess may be readily formed in proper position by boring through the boss 28 while the jet member 27 is in place in the head 21.

Beyond the screw threaded portion of the jet 27 and opposite from the enlarged portion 28, the diameter of the jet member is further reduced as indicated at 30, the jet member ultimately ending in a tapered portion 31 extending, when the nozzle is inserted within the head 21, beyond the intersection of vertical bore 23 with horizontal bore 26. The jet member 27 is centrally bored horizontally to provide a passage 32, which is of reduced diameter at the rear thereof. The front of the passage 32 is closed by a plug member 33, access to the passage may be had through the front opening in the head 21 provided by the bore 24, which opening in normal operation may be closed by a removable closure member 34, the outside of which conforms in general to the contour of the front portion of the head 21.

Within the bore 25 in head 21 there is inserted a tightly fitting tubular nozzle member 35, centrally bored as indicated at 36 through the major part of its length, and provided at the front end thereof with a tapered bore paralleling the tapered portion 31 of the nozzle member 27. The tubular member 35 is held in place by a set screw 37 inserted through the bore 38 at the upper portion of the head 21. The tubular nozzle member 35 contains a tube 39 formed of a yieldable plastic, such as "tygon," extending beyond the rear extremity of the nozzle member 35, and held in place therein by a compressing and retaining cap 40 screw threaded onto the member 35. The inner wall of the cap is slightly tapered at 41 to compress the end of the tube 39 and thereby reduce the size of the discharge opening of the tube. This taper may be approximately such as to reduce the diameter of the outlet orifice by about ⅕ the internal diameter of the tube 39.

The internal taper at the forward end of the tubular member 35 is such that the same operates as a reducing adapter between the diameter of the bore 26 and the inside diameter of the tube 39, thereby providing an abuttment within the member 35, against which the tube 39 is pressed by the cap 40.

To assure uniform rotation of the shaft 18 and to reduce vibration in the system, the shaft may be provided with a counterweight W supported on an arm projecting radially from the shaft diametrically opposite the lines 19 and 20.

For convenience of illustrating the operation employing the type of apparatus thus far described, it will be assumed that a silica-alumina hydrogel containing magnesium oxide is to be prepared. In this case, the reacting solutions may comprise an alkali metal silicate, and an aluminum salt solution or alkali metal aluminate solution containing acid or alkaline agents, to give the desired pH. The powder may be included in either of the reacting solutions, but is preferably added with the silicate solution. The silicate solution, which may be a commercial water glass (for instance "N-Brand") is admitted from any suitable proportionating or flow regulating means through a supply line 42, the solution passing through communicating channels into the bore 22 in the head 21, finally entering into the tube 39 by passing through the bored channel 32 in the jet 27. The alumina component may be furnished by an aqueous solution containing aluminum sulfate and sulfuric acid in required amount to obtain the desired pH. This solution is admitted in regulated quantity from a suitable supply source through the tube 43 and passes by communicating channels to the head 21, entering the annular space provided between the wall of the bore 26 and the jet member 27 and passing through the annular space between the parallel tapered wall 31 and the correspondingly tapered wall of the nozzle 35 into the tube 39, wherein it becomes admixed with the silicate solution and is thoroughly agitated therewith as a result of jet action and the modified venturi effect. The reaction mixture containing the incorporated magnesium oxide then flows along tube 39 in which hydrosol formation takes place and the formed hydrosol is forcibly ejected therefrom as a result of the pressure of the feeding of the solutions through the tapered portion 41, the hydrosol being projected as a stream which falls upon the surface of the oil in the tank 1. The reaction producing the hydrosol will generally be completed before the reaction mixture is discharged from the tube 39, but the possibility of continuing reaction beyond is not excluded.

In the preparation of silica gel, the reacting solutions introduced may be an alkali metal silicate and a mineral acid, such as hydrochloric or sulfuric, in concentration and amount furnishing the desired pH.

In the preparation of comparatively large beads (for instance of 1 mm. diameter or above in shrunken, dried or calcined state), it is advisable that the head 21 and the nozzle member 35 be maintained slightly above the surface of the oil in the tank, to avoid substantial agitation of the oil by the movement of the head. It is preferred, in any event, that at least the final set of the hyrogel take place at a level in the oil bath which is not being materially agitated.

The speed of rotation of shaft 18, and thereby the linear velocity of movement of the head 21, is controlled by suitable means (not shown), and is correlated with the flow rate of the reactant solutions into the nozzle 35, so that the rate of movement of the discharge outlet of the nozzle is approximately equal to the rate at which the hydrosol is discharged therefrom, but opposite in direction thereto. Under these conditions the discharge stream has no horizontal velocity component, or at least an immaterial one.

In the operation of the embodiment thus far described, it is preferred to employ an oil of lower specific gravity than that of the hydrosol entering the oil bath. The stream of hydrosol will then settle through the body of oil, and as a result of the interfacial tension between the oil and the hydrosol, the latter is broken up into globules which continue to settle in the body of the oil. The body of oil is preferably of sufficient depth to allow setting of the hydrogel to take place therein, so that the set hydrogel globules continuing their settling in the oil pass through the interface between the oil and the water or aqueous solution. The water or aqueous solution also operates as a carrier fluid to convey the wet hydrogel beads to storage or to further treatment.

As illustrated in the flow diagram (Fig. 6), the wet beads are brought by the aqueous liquid to a suitable tank, from which they may be withdrawn, in batch or continuous operations, for further processing. Thus, as shown, the hydrogel beads in the aqueous liquid may be conveyed to suitable equipment for "hot aging" of the hydrogel (if that step is to be practiced). In the "hot aging" treatment a portion of the carrier liquid may be heated and recirculated in contact with the wet hydrogel beads for a desired time. Aqueous liquid not required in supporting the hydrogel beads during transportation will be returned to the supply source for constantly replenishing the aqueous liquid in the setting tank 1.

The size of the formed hydrogel globules and accordingly of the ultimate shrunk beads (after drying) will be determined to a certain extent by the diameter of the stream issuing from the discharge nozzle 35 and the velocity of the stream relative to the body of immiscible liquid. Other factors entering into the determination of the degree of sphericity as well as the size of the hydrogel beads formed in the process include: the viscosity and density of the body of immiscible liquid as well as the viscosity and density of the hydrosol; and the interfacial tension between the particular immiscible liquid and the hydrosol in any given system.

In connection with the described embodiment, the liquid in which the setting of hydrosol to hydrogel takes place may be any liquid or combination of liquids substantially immiscible with water, and preferably liquids having a lower specific gravity than the hydrosol; such as: petroleum naphthas, kerosene, hydrocarbon oils; halogenated hydrocarbons such as carbon tetrachloride or perchlorethylene; alkylesters of carboxy acids such as dialkyl phthalates, for example dibutyl phthalate; etc., or physically compatible mixtures of the liquids recited giving desired density and viscosity. It is preferred to employ immiscible liquids of high viscosity compared with the hydrocol, since these tend to give beads of more uniform shape and size.

In using the emulsification technique for the production of beads, the hydrosol containing the incorporated powder substantially uniformly distributed therein, is emulsified in the water immiscible liquid and the droplets of sol thereby formed are maintained in emulsified form until the sol sets as hydrogel. This operation may be practiced as a batch procedure wherein the hydrosol and the immiscible liquid which will constitute the external phase of the emulsion are brought together and violently mixed or agitated as by means of a turbine stirrer. In general any of the types of water-immiscible liquids above mentioned in connection with the previous embodiment, may likewise be utilized for emulsification. In the batch operation there should be employed at least one volume of water immiscible liquid per volume of sol to be emulsified therein. When the immiscible liquid is of lower specific gravity than the sol, the emulsified material may be allowed to settle to the bottom of the oil phase after the droplets have set to hydrogel; while if a liquid heavier than the liquid hydrosol is employed as the external phase, such as carbon tetrachloride, the coagulated particles may be allowed to arise to the top for separation.

Instead of operating by batch methods, the hydrosol and the immiscible liquid may be emulsified by continuously feeding streams of the two liquids into admixture in regulated amounts. The required degree of agitation to effect emulsification may be obtained by the use of separately controlled stirrers and/or by the velocity of either or both of the streams.

A suitable system for producing beads of comparatively small particle size is illustrated in Figs. 3 and 4. In the operation of this illustrated embodiment, one of the reacting solutions containing powder may be introduced into the side inlet 100 of a jet mixer (see Figure 4), and the other reactant solution injected thereinto through a nozzle 101. Thus the two solutions are violently admixed in the zone 102, and the mixed reactants or the resulting hydrosol formed, as the case may be, is ejected through the discharge nozzle 103 into the oil bath 104. As a result of the impact of the liquid being injected into the oil bath at high velocity, and violent local agitation incident thereto, at least a temporary emulsion of droplets of hydrosol in the oil bath is obtained. Employing an oil which is lighter in gravity than the formed hydrogel globules, the latter will pass out of the zone of agitation and through the oil-water interface at 105 into a body of water or dilute aqueous solution below which also operates as a transporting liquid. The hydrogel beads may be conveyed in and by the aqueous medium, as by means of a conduit 106, to a drain generally indicated at 107; the drained liquid being returned by a conduit as indicated at 108 to the body of aqueous medium for reuse.

A quite simplified but highly efficient device that may be advantageously employed in forming small beads by a continuous emulsification procedure is illustrated in Figure 5. In the operation of this embodiment, one of the reactant solutions, say the sodium silicate containing powdered magnesia, is introduced at high velocity through line 110 into a chamber 111. There is also introduced into chamber 111 through a side line 112, the other reactant solution—such as an acid or an aluminum salt solution which may contain acidic or alkaline substances. The two solutions are violently admixed in the zone 113 in chamber 111 and forcibly ejected therefrom through discharge nozzle 114 into a surrounding mixing head 115. Oil or other water-immiscible liquid is introduced into the mixing head 115 through a side line 116, and there contacted with the previously admixed reactants or the hydrosol resulting therefrom, in the mixing zone 117. This results in violent agitation and intimate admixture of oil and hydrosol because of the impact and velocity of flow, so that a fine dispersion of droplets of hydrosol in oil is obtained. The discharge nozzle 118 from the mixing zone 117 to the tip 119 is preferably of suitable length consistent with the setting time of the hydrosol that setting takes place therein. Thus, minute beads of hydrogel distributed in oil are discharged at the tip 119. The hydrogel beads may be discharged with the oil into a tank containing water or aqueous solution for separation from the oil, the separated oil being returned for reuse through pipes connected to line 116. If desired, centrifugal or other means for separating oil from the beads may be employed, particularly when formed at high product concentration and therefore having sufficient strength in wet state to withstand such operations.

The device just described is particularly efficient for use with very rapidly setting hydrosols and offers further advantages in enabling emulsification with comparatively small quantities of oil, thereby materially reducing required size and cost of equipment.

The size of the finished gel particles after drying will depend upon the initial size of the wet hydrogel beads, which in turn is controlled by the size of the emulsified droplets. In general the emulsification technique, whether employing the illustrated embodiments, the described batch method, or other continuous methods; is best adapted for production of beads which when shrunk in drying are of an average size below about 200 microns and largely in the range of about 50-200 microns. By increasing the effectiveness of the emulsification for instance by increased rapidity of agitation, particles of less than 50 micron size predominantly, may be produced if desired.

The aqueous solution employed as a sluicing or carrier liquid in connection with the embodiment illustrated in Figure 1 or that illustrated in Figure 3, is preferably a dilute salt solution of proper specific gravity to support the oil above. For this purpose dilute aqueous solutions of salts which are relatively inert with respect to the hydrogel may be employed. For instance a 5% to 10% solution of sodium sulfate ($Na_2SO_4$) has been found satisfactory for the purpose.

In any of the methods of bead formation above described, the magnesium oxide powder may be incorporated by suspending the same in either of the solutions introduced into the mixing zone in which the final reactant solution or the hydrosol is formed, or the powder may be added through a separate inlet to the mixing zone as a slurry or suspension in a compatible liquid, such as water.

It should be noted in passing that by the inclusion of the powder, the setting time of the hydrosol is accelerated; so that reduced product concentration of the principal reactants is required to effect setting in any given time. For instance, a composition of about 8 to 9 pH having a product concentration of 100 grams $SiO_2$ and $Al_2O_3$ per liter will set in about ¼ to ½ second at about room temperature. With the incorporation of a sufficient quantity of powder in the composition, setting will take place under like conditions and in about the same time at product concentration of the $SiO_2$ and $Al_2O_3$ in the reactant solutions equal to about 90 grams per liter. Elevation of temperature also accelerates setting of the hydrosol.

To obtain the full advantages of the incorporated powder as an active constituent of the catalyst, as well as to facilitate drying with reduced breakage, and to provide a bead of desired open structure which can be rapidly regenerated, the magnesium oxide should be employed in a size of less than about 35 microns and preferably of about 5 to 15 microns average size. It is pointed out in my parent application Serial No. 529,594 hereinbefore identified, that the quantity of powder to be employed is best measured on the basis of volumetric ratio to gel, because of differences in density of the various powders that may be employed. The preferred volumetric ratio therein indicated lies in the range of 0.35 to 1, determined as the ratio of the weight percent of powder divided by the apparent density of the powder, to the weight percent of gel divided by the particle density (chunk density) of the gel. Measurement of the apparent density of the powder is made by placing a weighted sample of the powder in a metal cylinder of known volume per unit length, inserting a closely fitting piston on top of the powder and tamping the piston until no further contraction of the body of powder is observed, the tamping being done with a light hammer. Accurate measurement can be made when the total length of the cylinder occupied by powder is approximately one inch in a cylinder approximately one inch in diameter. When a longer cylinder is employed, say one of eight inch length, it has been observed that proper packing is obtained at the ends of the cylinder but not intermediate its length. The chunk density of the gel is obtained by drying samples of the gel without any included powder. Such chunks of gel, unless dried with extreme caution, will practically all break down to smaller pieces. This, however, does not vitiate the measurement of the chunk density. Prior to measurement the dried gel is heat treated, as for example, at 1400° F. for 10 hours, to produce normal shrinkage. A sample of the largest pieces obtained after heat treatment is weighed and the voids in the pieces of the weighed sample are saturated with water. All surface water, in so far as possible, is removed. The chunk volume is then measured in a pycnometer.

Within the above indicated volumetric range of powder to gel "light" or "heavy" magnesia can be used, so long as at least about 10% to 15% of magnesia by weight of gel is thereby provided. The presence of this minimum weight quantity of magnesia is prescribed, because as hereinafter explained, a portion of the magnesia introduced is intended to become chemically associated with components of the gel, and in so doing may be dissolved and be no longer present in particulate form. The portion which may be thus dissolved will depend upon the manner in which the hydrogel is processed and finished, which can be controlled to vary the amount of magnesia which will become associated as an active component of the catalyst, thereby offering a certain degree of flexibility by which the properties of the final dried catalyst can be varied as desired. By proper control of the processing of the gel up to about 90% and as little as desired of the incorporated powder can be retained in the hydrogel as powder, while obtaining active catalysts having in general the characteristic catalytic properties of silica-magnesia or silica-alumina-magnesia.

Although the quantity of introduced magnesia powder as well as the quantity which is retained as powder during finishing and drying of the hydrogel may be varied over a fairly wide range as above indicated, it may be stated as a general rule that bead catalysts of improved properties are obtained when there is introduced into the hydrosol an amount of magnesium oxide powder equal to about 20 to 50% by weight of the gel to be produced (on 105° C. dry basis) whether the hydrosol be of silica alone or of silica-alumina. With this quantity of magnesia powder, under most conditions, sufficient magnesia is provided (1) for chemical combination with components of the gel to produce catalysts of desired activity and selectivity, and (2) sufficient magnesia in powder form which will be present during drying of the hydrogel to effect substantial improvement in the regeneration characteristics of the bead and other desired enhanced properties.

Reference has been made above to the hot aging of the hydrogel beads in the wet state. The purpose of this step is to control the density of the gel. Suitably aged gels have a lower bulk density indicative of a more open gel structure. In addition, it was found that the catalytic activity of catalyst prepared from aged hydrogel can be more uniformly controlled.

The wet hydrogel beads may be aged by maintaining them in a body of aqueous liquid for a comparatively long time at moderate temperatures, but it is preferred to employ hot liquids at a temperature of 120 to 160° F. in order to accelerate the aging. At these temperatures about 4 to 8 hours aging is generally sufficient. The aqueous liquor in which the wet beads are conveyed may be employed as the aging medium by heating the liquid containing the hydrogel beads as a batch; or the aqueous liquor may be recirculated through a suitable heating means.

Referring again to the illustrated flow diagram in Figure 6, the hydrogel beads after aging are washed and treated to free the same of alkali metal. Such purification is preferably carried out to a sufficient extent to reduce the alkali metal content of the ultimate catalyst to less than about 0.3% $Na_2O$. This may be accomplished advantageously by treating the beads with dilute acid or acidic solutions or with a salt solution comprising a cation capable of zeolitically replacing sodium in the beads. Thus the beads may be treated to required extent with ammonium salts such as ammonium sulfate or ammonium chloride thereby replacing the sodium by a volatile cation which can be removed by calcination. If desired, metallic salt solutions providing a cation which will become permanently incorporated in the catalyst and which is not deterimental thereto may be employed. Thus, the catalyst may be treated with aluminum salt solution such as aluminum sulfate and a portion of the desired alumina content of a silica-alumina-magnesia catalyst thereby furnished. On the other hand, a portion of the magnesia content of the ultimate catalyst in addition to that provided by the contained powder particles may be introduced by base-exchanging the hydrogel with a soluble magnesium salt such as magnesium sulfate.

The hydrogel particles after purification as above described and to a required extent, are washed in water to remove adhering soluble salts and then subjected to drying.

The liquid treating steps shown in the flow sheet (Figure 6) may be operated continuously as a counter-current system, by the provision of a required number of treating tanks. Thus, for instance, a plurality of tanks would be provided for water washing and also five or more tanks for base-exchanging the hydrogel beads, the treating liquid discharged from one tank being successively brought to the next preceding tank. In this manner the final water washes and the final base exchange treatments are carried out with the purest solutions. The discharged liquid from the tank in which the hydrogel is first water washed will be circulated to the last base-exchanging step in the series, for full utilization of valuable treating solution. The discharged liquid from the first tank in which base-exchange is performed may be added, if desired, to the aging liquor.

To avoid breakage or weakening of the gel structure incident to rapid shrinkage during drying, the drying operation ordinarily must be carefully carried out. Hydrogel globules containing incorporated powder particles of proper size and in adequate amount can be subjected to more sever and more rapid drying conditions with considerably less breakage than hydrogels free of such powder, as disclosed in my aforesaid copending application Serial No. 529,594.

Careful drying of the hydrogel globules may be accomplished by prolonging the period of drying so that the rate of evaporation of water from the surface does not exceed the rate of diffussion of the liquid from the interior to the surface. Such control of evaporation rate may be performed, for instance, by regulating the contributing factors such as the velocity of the gaseous medium contacting the hydrogel, and the temperature and humidity maintained during the drying period. Efficient drying can be successfully accomplished in known manner by currents of superheated steam or by the use of organic liquids forming azeotropic mixtures with water. The hydrogel beads containing incorporated powder may be subjected to drying without previous purification or washing, and these liquid treating steps postponed until after drying has been effected.

The dried gel beads may be calcined or heat treated in air, steam, inert gas, or mixtures of these, prior to use as catalysts in the hydrocarbon conversion operation. Such heat treatment need not always be practiced, since the catalyst, as is known, will be subjected to high temperature conditions incident to its use during hydrocarbon conversion and regeneration.

Although I do not wish to be bound by any particular theory, it is believed that part of the magnesia powder incorporated in the hydrosol and present in the wet hydrogel, enters into a complex chemical combination with the components of the sol or hydrogel, such as with the silica or with the silica-alumina. In doing so, it is believed that as to that part which is chemically combined, the particulate form of the magnesia is not retained. The small particles of magnesia still present in the dried gel beads are made up of the portion which has not been chemically combined in the complex, or which is coordinated in the complex only at the surface of said particles. To obtain the full advantages of the present invention, therefore, with the retention of at least a portion of the magnesia in particulate form during the drying operation, the conditions of preparation of the gel beads should be so regulated relative to the amounts of magnesia initially introduced into the sol, that not all of the powder will enter into chemical combination in the hydrogel. My observations lead to the belief that lowered pH below about pH 10 favors chemical combination of the magnesia with the silica or silica-alumina components of the hydrogel, and accordingly the pH of the solutions employed in the purification of the wet hydrogel must also be controlled as well as the duration of the wet treatments, particularly in instances where only relatively small amounts of magnesia, say less than about 15 to 20% by weight, are initially introduced in the hydrosol. On the other hand, when larger quantities of magnesium oxide are initially introduced, as in the order of about 30%–50% by weight or more of the dry weight of the gel, a sufficient quantity of powder will usually be retained as such in the beads and be present during drying, notwithstanding substantial time of aging of the hydrogel in the order of up to 8 hours or more. It will be understood from the foregoing that in the purification treatment of the hydrogel, the use of solutions which highly favor chemical combination of the magnesia in the siliceous hydrogel is more particularly advocated for the treatment of hydrogels having a comparatively high magnesia powder content, wherein the presence of a desired residual quantity of the powder as such during the drying of the gel is assured. Chemical combination of the magnesia is believed to take place more readily with increased concentration of magnesium ions in the treating solution, such as when aqueous solutions of magnesium sulfate are employed as such for exchanging sodium, or the increased concentration of magnesium ions in solution may be due to the initial dissolution of considerable portions of the powdered magnesia from the hydrogel as might be the case with highly acidic treating solutions.

Active silica-magnesia catalysts are obtained when such catalysts contain about 5 to 30% MgO (on total weight of catalyst composite) in chemical combination with silica. Since, however, it is preferred that a portion of the powder be retained in the gel as such (that is in a form not chemically combined with the silica), the amount of powdered magnesia incorporated will be more than that required for such chemical combination. By using an amount of magnesia powder equal to 30% to 50% by weight of the gel (on a dry basis), the presence of an adequate amount of powder during drying of the hydrogel is also generally taken care of.

The preferred silica-alumina-magnesia catalysts are those containing (based on dry weight of catalyst composite) 1 to 5% of alumina and 5 to 20% magnesia. By the incorporation of a larger quantity of magnesium oxide into the hydrosol, for instance as in the case of silica-magnesia catalyst above, the presence of an adequate amount of powder to provide the desired open structure of the gel is assured. It will be understood that a portion of the required powder to provide gels capable of more rapid drying or normal drying with reduced breakage under the drying conditions employed, may be made up of inert and insoluble powders of the type described in my copending application Serial No. 529,594, now U. S. Pat. No. 2,487,065.

In any of the methods heretofore described for the preparation of beads, globules of hydrosol are formed in the water immiscible liquid as a result of the interface which exists between the hydrosol and that liquid. The globules so formed, therefore, will be generally spheroidal or substantially spherical, having bounding surfaces corresponding to the outline of the interface. The dried gel beads ultimately obtained by drying of the hydrogel globules will be reduced in size as a result of shrinkage in drying, but will conform generally to the shape of the parent globules, and depending upon the various forces acting upon the unset globules in the formative stage, may depart from true spheres and take on more or less the shape of oblate spheroids, prolate spheroids, or the like. An important factor governing the shape of the formed bead is the rate at which the globules of hydrosol travel through the water immiscible liquid, which in turn is dependent upon the relative density and viscosity of the medium employed. For instance, in a medium of low viscosity having a density considerably less than that of the hydrosol, the globules will travel through the immiscible medium more rapidly and will tend to assume a flatter or more disk-like shape. With a water immiscible medium having a density approximate to that of the hydrosol, a slower movement of the globules of hydrosol will result, with consequent formation of more spherical beads. In the preferred operation, to obtain beads of good sphericity, one may employ an immiscible liquid having a specific gravity in the order of about 0.2 less than the specific gravity of the wet hydrogel, and the aqueous solution therebelow may have a specific gravity in the order of about 0.1 less than the specific gravity of the hydrogel, so that the formed hydrogel beads will pass slowly through the oil phase and through the aqueous liquid therebelow.

The following examples illustrate typical operations for the formation of catalysts in practice of the invention and should not be construed as limitations thereon.

*Example I*

7.16 parts by weight of dry ground magnesium oxide powder (ignited at 1600° F. weight basis, all through 325 mesh) was stirred in water at room temperature and the slurry obtained permitted to stand for about 20 hours. To the slurry there was then added commercial sodium silicate solution ("N-Brand"), furnishing 10.5 parts by weight $SiO_2$, and the mixture then left to stand for about 2 hours.

The silicate containing slurry was then further admixed with sulfuric acid solution of 1.050 specific gravity (containing about 3.28 parts by weight of 95–96% $H_2SO_4$) in the ratio of 60 parts by volume silicate slurry to 40 parts by volume acid, by continuously bringing together streams of the two liquids in a jet mixer of the type illustrated in Figures 1 and 2 of the accompanying drawings. There was thereby formed a siliceous hydrosol containing hydrated magnesia which set to a firm hydrogel in about 2.5 seconds at 25° C. having a pH of 10.

The hydrosol was ejected through a nozzle (4.7 mm. diameter) onto the surface of a water-immiscible liquid composed of a mixture of light mineral oil and perchlorethylene, which mixture had a specific gravity of 1.03. The mixture head and attached nozzle were rotated at 172 R. P. M.

Substantially similarly sized droplets of hydrosol were thereby formed and distributed in the immiscible liquid, which droplets set to firm gel as spheroidal globules. The gel globules passed from the immiscible liquid into an aqueous solution of sodium sulfate (1.10 sp. gr.) therebelow, and were then transferred to an aging vat in which the globules were aged in aqueous sodium sulfate solution (1.04 sp. gr.) for about six hours at 130° F.

(a) A portion of the aged gel globules was thoroughly washed in water, and thereafter treated to remove alkali metal by washing over a period of eight hours with dilute aqueous magnesium sulfate solution (5% by weight $MgSO_4$ on total solution basis), the magnesium sulfate solution being changed four times during the treatment; followed by extensive water washing until the wash water was substantially sulfate free.

The washed gel was dried in a steam oven at 250° F. for eight hours. Beads of acceptable hardness were obtained with a fairly low percent of breakage during drying. In calcined state these beads had an apparent bulk density of 0.82 kg./liter.

(b) A second portion of the aged gel was treated similarly to (a) above except that ammonium sulfate solution was employed to remove alkali metal. The obtained beads had an apparent bulk density of 0.62 kg./liter.

The initial long standing of the magnesium oxide in the water slurry above described effected hydration of the magnesia. It is believed that such a step of aging the magnesia in water at room or elevated temperature for about 4 to about 24 or more hours is desirable to diminish swelling of the magnesia when in the hydrogel, which might take place if dry powder were directly incorporated in the hydrosol.

*Example II*

Silica-magnesia beads produced in accordance with the procedure above described (Example I) were employed in cracking of a light East Texas gas oil (boiling over the range of 440 to 760° F.) at 800° F., under atmospheric pressure and at a liquid space rate of 1.5 (volumes of cat./volumes oil/hour) over ten-minute on-stream periods. The yields over a number of runs were fairly consistent and averaged 40.3% gasoline by volume of charge, with the production of 3.0% coke by weight of charge, and 3.0% by weight dry gas of 1.45 gravity.

Silica-alumina-magnesia catalyst may be prepared in the same manner as the silica-magnesia catalyst illustrated in Example I, by forming a silica-alumina hydrosol instead of a silica hydrosol in which the magnesia powder is incorporated. The proportions of silica, alumina, and magnesia may be varied over a wide range to provide catalysts of desired properties.

*Example III*

To prepare a silica-alumina-magnesia catalyst containing 2% $Al_2O_3$ (by weight of dried catalyst) the method illustrated in Example I may be followed, employing the reactants in the following proportions: 38 parts by weight MgO, sodium silicate to furnish $SiO_2$ equivalent of 60 parts by weight, sodium aluminate to furnish $Al_2O_3$ equivalent to 2 parts by weight, sulfuric acid solution to provide 17.8 parts by weight $H_2SO_4$.

The sodium aluminate in solution and the sodium silicate solution are added to a slurry of the MgO (which has preferably been aged to permit hydration to take place) and immediately admixed with the addition of the sulfuric acid. Subsequent processing may be similar to that described in Example I.

Obviously many modifications and variations of the invention as hereinbefore set forth may be made without departing from the spirit and scope thereof and therefore only such limitations should be imposed as are indicated in the appended claims.

I claim as my invention:

1. The method of preparing siliceous gel beads of improved porosity containing magnesia in catalytically active form, which comprises distributing in a fast-setting siliceous hydrosol magnesia in the form of particles of a size less than 50 microns and in an amount corresponding to 20 to 50% by weight of dried gel to be produced, whereby a portion of the magnesia is retained in particulate form in the set gel at least during subsequent treatment including drying; suspending the hydrosol as droplets in a water-immiscible medium and setting the droplets to form hydrogel globules containing at least part of the magnesia distributed therein in particle form, base exchanging and washing the globules to free the same of alkali metal ions under pH conditions and during a period insufficient to effect dissolution of all of the magnesia particles in the hydrogel, and drying the hydrogel globules while containing particles of undissolved magnesia therein to form hydrogel beads.

2. The method defined in claim 1 wherein said siliceous hydrosol consists essentially of hydrous silica and hydrous alumina.

3. The method defined in claim 1 wherein said siliceous hydrosol is prepared by interaction of an alkali-metal silicate and a soluble aluminum compound at a pH of 5 to 9 and a product concentration of silica and alumina in the reaction mixture above 80 grams per liter.

4. The method according to claim 1 wherein said magnesia particles are hydrated before distribution in said siliceous hydrosol.

5. The method of preparing siliceous gel beads having an open pore structure and containing magnesia associated in the gel in catalytically active form, which comprises: soaking magnesia powder in water for time sufficient to effect hydration thereof, said magnesia being of a particle size less than 50 microns, admixing said hydrated magnesia, in quantity sufficient to provide 30–50% by weight of dried gel produced, with aqueous alkali metal silicate solution and with an aqueous solution of a soluble aluminum compound at a pH and in a product concentration to form a hydrosol capable of setting to a firm hydrogel in not more than five seconds; ejecting the hydrosol onto the surface of a water-immiscible liquid of lower specific gravity than said hydrosol to form droplets of hydrosol in said liquid, which droplets contain magnesia in particle form; setting said droplets of hydrosol to hydrogel globules while descending in said liquid; hot aging said globules containing magnesia in particle form therein, treating the aged globules with magnesium sulfate solution thereby effecting release of base-exchangeably held alkali-metal ions therefrom and causing a portion but not all of the magnesia particles to become chemically combined in the hydrogel, so that said hydrogel contains at least about 5% magnesia therein in chemical combination; washing the hydrogel to remove soluble materials; and subjecting the washed hydrogel to drying while still containing magnesia therein in particle form to produce dry gel beads.

THOMAS H. MILLIKEN, Jr.

REFERENCES CITED

The following references are of record in the file of this patent:

UNITED STATES PATENTS

| Number | Name | Date |
|---|---|---|
| 2,271,319 | Thomas | Jan. 27, 1942 |
| 2,343,295 | Bailie et al. | Mar. 7, 1944 |
| 2,371,079 | Thomas et al. | Mar. 6, 1945 |
| 2,384,945 | Marisic | Sept. 18, 1945 |
| 2,396,758 | Stratford | Mar. 19, 1946 |
| 2,412,958 | Bates et al. | Dec. 24, 1946 |
| 2,435,158 | Read | Jan. 27, 1948 |
| 2,453,585 | Payne et al. | Nov. 9, 1948 |
| 2,467,407 | Ruthruff | Apr. 19, 1949 |
| 2,470,410 | Nelson | May 17, 1949 |
| 2,472,831 | Hunter et al. | June 14, 1949 |
| 2,480,627 | Bodkin et al. | Aug. 30, 1949 |
| 2,533,278 | Milliken et al. | Dec. 12, 1950 |
| 2,551,014 | Kimberlin et al. | May 1, 1951 |
| 2,562,888 | Bond | Aug. 7, 1951 |